United States Patent
Sakamoto et al.

(10) Patent No.: US 10,514,114 B2
(45) Date of Patent: Dec. 24, 2019

(54) HOSE FOR TRANSPORTING REFRIGERANT

(71) Applicant: Sumitomo Riko Company Limited, Komaki-shi, Aichi (JP)

(72) Inventors: Yoshihiro Sakamoto, Komaki (JP); Motoki Hirado, Komaki (JP); Koji Mizutani, Komaki (JP); Masashi Noda, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 16/376,111

(22) Filed: Apr. 5, 2019

(65) Prior Publication Data

US 2019/0234538 A1 Aug. 1, 2019

Related U.S. Application Data

(63) Continuation of application No. PCT/JP2017/026407, filed on Jul. 21, 2017.

(30) Foreign Application Priority Data

Dec. 27, 2016 (JP) .................................. 2016-252498

(51) Int. Cl.
*F16L 11/12* (2006.01)
*F25B 41/00* (2006.01)
(Continued)

(52) U.S. Cl.
CPC ............... *F16L 11/12* (2013.01); *B32B 1/08* (2013.01); *B32B 25/08* (2013.01); *C08L 77/06* (2013.01);
(Continued)

(58) Field of Classification Search
CPC ........ F16L 11/12; F25B 41/003; B32B 25/08; B32B 1/08; B32B 2597/00; C08L 77/06
See application file for complete search history.

(56) References Cited

U.S. PATENT DOCUMENTS

2012/0076964 A1 3/2012 Mitadera et al.
2012/0094048 A1 4/2012 Mitadera et al.
(Continued)

FOREIGN PATENT DOCUMENTS

JP 4811531 B2 11/2011
JP 2014-148560 A 8/2014
(Continued)

OTHER PUBLICATIONS

International Search Report dated Sep. 5, 2017, issued in counterpart International Application No. PCT/JP2017/026407, with English Translation. (4 pages).
(Continued)

*Primary Examiner* — Michael C Miggins
(74) *Attorney, Agent, or Firm* — Westerman, Hattori, Daniels & Adrian, LLP

(57) ABSTRACT

Provided is a hose for transporting a refrigerant, including an innermost layer having a tubular shape and a rubber layer arranged on an outer periphery of the innermost layer, wherein the innermost layer is formed of a resin composition containing a polymer, which contains a polyamide resin (A) as a main component, and an aromatic secondary amine compound (B) having two secondary amino groups per molecule and having a melting point of 100° C. or more. Accordingly, the hose for transporting a refrigerant excellent in refrigerant permeation resistance, flexibility, and the like, and also excellent in performance of preventing the hydrolytic deterioration of the innermost layer of the hose can be provided.

2 Claims, 1 Drawing Sheet

(51) Int. Cl.
    *B32B 25/08*    (2006.01)
    *C08L 77/06*    (2006.01)
    *B32B 1/08*     (2006.01)
(52) U.S. Cl.
    CPC ........ *F25B 41/003* (2013.01); *B32B 2597/00* (2013.01)

(56) References Cited

U.S. PATENT DOCUMENTS

| | | |
|---|---|---|
| 2013/0025733 A1 | 1/2013 | Yamakawa et al. |
| 2013/0327434 A1 | 12/2013 | Kawai |
| 2014/0342145 A1 | 11/2014 | Oguro et al. |

FOREIGN PATENT DOCUMENTS

| | | |
|---|---|---|
| JP | 5723520 B2 | 5/2015 |
| WO | 2005/097903 A1 | 10/2005 |
| WO | 2010/143638 A1 | 12/2010 |
| WO | 2010/143668 A1 | 12/2010 |
| WO | 2012/115147 A1 | 8/2012 |
| WO | 2013/088932 A1 | 6/2013 |

OTHER PUBLICATIONS

Notification of Transmittal of Translation of the International Preliminary Report on Patentability (Form PCT/IB/338) issued in counterpart International Application No. PCT/JP2017/026407 dated Jun. 27, 2019, with Form PCT/IPEA/409. (9 pages).

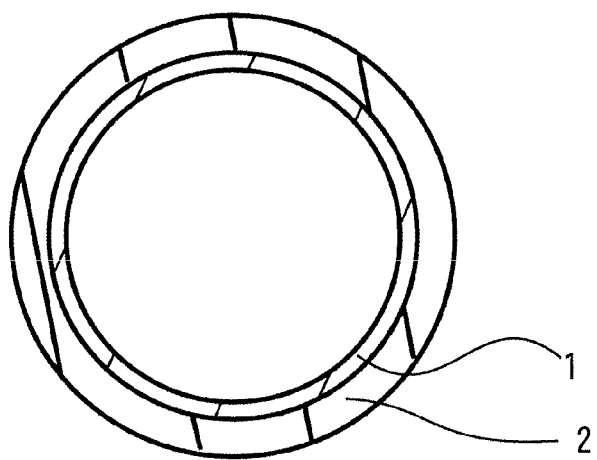

_US 10,514,114 B2_

HOSE FOR TRANSPORTING REFRIGERANT

RELATED APPLICATION

This application is a continuation of International Application No. PCT/JP2017/026407, filed on Jul. 21, 2017, which claims priority to Japanese Patent Application No. 2016-252498, filed on Dec. 27, 2016, the entire contents of each of which being hereby incorporated by reference.

TECHNICAL FIELD

The present disclosure relates to a hose for transporting a refrigerant useful as a hose for transporting a refrigerant for a vehicle, such as an automobile.

BACKGROUND ART

Hitherto, along with a tightened regulation on the transpiration of an ozone layer-depleting gas, a demand on the refrigerant barrier property (refrigerant permeation resistance) of a hose for transporting a refrigerant to be used for an automobile or the like has become stringent. Accordingly, for example, a resin having high crystallinity, such as a polyamide resin, has been used as a forming material for an innermost layer of the hose for transporting a refrigerant (see, for example, PTL 1 to PTL 3).

Meanwhile, along with a tightened regulation on the transpiration of an ozone layer-depleting gas, in recent years, an improvement has been made in quality of the refrigerant to be used for an automobile or the like as well. For example, an R-1234yf refrigerant (HFO-1234yf refrigerant) has been developed as an alternative refrigerant to an HFC-134a refrigerant, and is a refrigerant having low ozone depletion potential and global warming potential, thus being extremely friendly to the global environment, as compared to HFC-134a. Accordingly, the hose for transporting a refrigerant to be used for an automobile or the like is also required to have performance suited to R-1234yf.

RELATED ART DOCUMENT

Patent Document

PTL 1: WO-A1-2012/115147
PTL 2: JP-B2-5723520
PTL 3: JP-B2-4811531

SUMMARY

However, when a refrigerant composition containing a fluorine compound having a double bond, such as the R-1234yf refrigerant, and a lubricating oil (refrigerating machine oil) is used, an organic acid and an inorganic acid are generated through the decomposition of the fluorine compound and the lubricating oil under a high-temperature environment. In addition, there is a problem in that contact with the organic acid and the inorganic acid causes a polyamide resin constituting the innermost layer of a hose to be hydrolyzed, resulting in its deterioration.

In this connection, the hose according to PTL 1 described above includes an innermost layer obtained by blending the polyamide resin with a divalent or trivalent metal compound, the hose according to PTL 2 described above includes an innermost layer obtained by blending the polyamide resin with a carbodiimide, which is an organic compound, and the hose according to PTL 3 described above includes an innermost layer obtained by blending the polyamide resin with hydrotalcite. Each of those techniques seems to enhance hydrolysis-preventing performance (acid resistance). However, for example, when the metal compound (inorganic compound) is added as described in PTL 1, a problem arises in that the curing of the polyamide resin is promoted to reduce flexibility, or the oxidative deterioration reaction of the polyamide resin is promoted to considerably degrade heat resistance. In addition, when the carbodiimide, which is an organic compound, is added as described in PTL 2, a problem arises in that an imide group thereof reacts with a carboxyl group or a hydroxy group of the polyamide resin, and hence a crosslinking reaction occurs between polymers to provide a chain extending effect, to thereby cause a reduction in flexibility. In addition, when hydrotalcite is added as described in PTL 3, unless its addition amount is set to a large amount, the hydrolysis-preventing performance (acid resistance) cannot be enhanced, and hence a problem arises in that the large amount addition results in a reduction in flexibility and a reduction in molding processability in, for example, twin-screw kneading or extrusion of the polyamide resin. Therefore, there is still room for improvement.

The present disclosure has been made in view of such circumstances, and an object of the present disclosure is to provide a hose for transporting a refrigerant excellent in refrigerant permeation resistance, flexibility, and the like, and also excellent in performance of preventing the hydrolytic deterioration of the innermost layer of the hose.

In order to achieve the above-mentioned object, according to one embodiment of the present disclosure, there is provided a hose for transporting a refrigerant, including: an innermost layer having a tubular shape; and a rubber layer arranged on an outer periphery of the innermost layer, wherein the innermost layer comprises, as a polymer, a blend polymer formed of the following component (A-1) and component (A-2), the blend polymer comprising the following component (A-1) as a main component, wherein the innermost layer comprises, with respect to 100 parts by weight of the blend polymer, the following component (B) in a range of from 1 part by weight to 50 parts by weight, and wherein, in the innermost layer, island phases of the following component (A-2) are dispersed in a sea phase of the following component (A-1): (A-1) at least one aliphatic polyamide resin selected from the group consisting of polyamide 46, polyamide 6, polyamide 66, polyamide 610, polyamide 612, and polyamide 1010; (A-2) a polyolefin elastomer; (B) an aromatic secondary amine compound having two secondary amino groups per molecule and having a melting point of 200° C. or more.

That is, the inventors have made extensive investigations in order to solve the above-mentioned problems. In the course of the investigations, the inventors have made an investigation on the adoption of a polyamide resin layer as the innermost layer of a hose from the viewpoints of refrigerant permeation resistance, flexibility, and the like, and the arrangement of a rubber layer on the outer periphery of the innermost layer for enhancing hose strength, bending resistance, and water resistance. In addition, in order to suppress the hydrolysis of the polyamide resin resulting from an organic acid and an inorganic acid generated from a refrigerant, the inventors have made an investigation as to whether the acids that react with the polyamide resin can be stably sealed by adding various aromatic basic compounds into the innermost layer. As a result, the incorporation of an aromatic secondary amine compound having two secondary amino groups per molecule and having a melting point of 100° C. or more into the innermost layer has provided results suggesting that, even with a small content thereof, a hydrogen ion (H+) and a negative ion of the organic acid and the inorganic acid generated from the refrigerant are effectively trapped by the secondary amino groups to produce stable salts. Accordingly, the hydrolysis of the polyamide resin can be effectively suppressed without the impairment of the molding processability of the innermost layer. Besides, the aromatic secondary amine compound does not show a crosslinking reaction with the polyamide resin, and hence does not impair the flexibility of the polyamide resin, and is also excellent in thermal deterioration resistance. Thus, the inventors have found that the desired object can be achieved, and have reached the present disclosure.

If the melting point of the aromatic secondary amine compound is less than 100° C., a difference in viscosity between the polyamide resin and the aromatic secondary amine compound at the time of the extrusion molding of the innermost layer of the hose is large, and hence is considered to result in a state in which the aromatic secondary amine compound is unevenly distributed in the polyamide resin. Accordingly, the hydrolysis of the polyamide resin cannot be effectively suppressed. Meanwhile, when the melting point of the aromatic secondary amine compound is 100° C. or more as in the present disclosure, the difference in viscosity between the polyamide resin and the aromatic secondary amine compound at the time of the extrusion molding of the innermost layer of the hose is small, and hence results in a state in which the aromatic secondary amine compound is uniformly distributed in the polyamide resin. Presumably as a result of this, the hydrolysis of the polyamide resin can be effectively suppressed as described above.

The hose for transporting a refrigerant of the present disclosure includes the innermost layer having a tubular shape and the rubber layer arranged on the outer periphery of the innermost layer, wherein the innermost layer is formed of a resin composition containing the polymer, which contains the polyamide resin (A) as the main component, and the aromatic secondary amine compound (B) having two secondary amino groups per molecule and having a melting point of 100° C. or more. Accordingly, the hose for transporting a refrigerant of the present disclosure is excellent in refrigerant permeation resistance, flexibility, and the like, and also excellent in performance of preventing the hydrolytic deterioration of the innermost layer of the hose, and as a result, can be satisfactorily used for not only a conventional refrigerant and water, but also a refrigerant that is liable to exhibit acidity, such as the R-1234yf refrigerant. In addition, the hose for transporting a refrigerant of the present disclosure is also excellent in bending resistance, water resistance, hose strength, and the like by virtue of the rubber layer arranged on the outer periphery of the innermost layer.

Particularly when the polymer containing the polyamide resin (A) as the main component is a blend polymer of an aliphatic polyamide resin and a polyolefin elastomer, the flexibility, the durability, and the like become more excellent.

In addition, when the melting point of the aromatic secondary amine compound (B) is 130° C. or more, more preferably 200° C. or more, the performance of preventing the hydrolytic deterioration becomes more excellent.

Further, when the aromatic secondary amine compound (B) is a compound having two or more aromatic rings per molecule, the thermal deterioration resistance becomes more excellent.

In addition, when the resin composition is a resin composition containing, with respect to 100 parts by weight of the polymer containing the polyamide resin (A) as the main component, the aromatic secondary amine compound (B) in the range of from 0.5 parts by weight to 50 parts by weight, a satisfactory hydrolysis-preventing effect can be obtained without the impairment of the flexibility of the hose or the molding processability.

BRIEF DESCRIPTION OF DRAWINGS

FIG. 1 is a cross-sectional view for illustrating an example of a hose for transporting a refrigerant of the present disclosure.

DESCRIPTION OF EMBODIMENTS

Embodiments of the present disclosure are hereinafter described in detail. The present disclosure is not limited to these embodiments.

As illustrated in FIG. 1, a hose for transporting a refrigerant of the present disclosure includes an innermost layer 1 having a tubular shape and a rubber layer 2 arranged on the outer periphery of the innermost layer 1, wherein the innermost layer 1 is formed of a resin composition containing a polymer, which contains a polyamide resin (A) as a main component, and an aromatic secondary amine compound (B) having two secondary amino groups per molecule and having a melting point of 100° C. or more. Herein, the "main component" of the polymer means 50 wt. % or more of the entirety of the polymer, and is intended to encompass even a case in which the entirety of the polymer is formed only of the polyamide resin (A) serving as the main component.

Examples of the polyamide resin (A) to be used for the polymer of the resin composition for forming the innermost layer 1 include: aliphatic polyamide resins, such as polyamide 46 (PA46), polyamide 6 (PA6), polyamide 66 (PA66), polyamide 610 (PA610), polyamide 612 (PA612), and polyamide 1010 (PA1010); and aromatic polyamide resins, such as polyamide 6T (PA6T), polyamide 9T (PA9T), and polyamide 10T (PA10T). Those resins may be used alone or in combination thereof. Of those, PA6 or PA66 is suitably used because of more excellence in flexibility and refrigerant permeation resistance.

As described above, the polyamide resin accounts for 50 wt. % or more of the polymer of the resin composition for forming the innermost layer 1, and the entirety of the polymer may be the polyamide resin.

In addition, in the case where a polymer other than the polyamide resin is blended, when the polymer containing the polyamide resin (A) as the main component is a blend polymer of an aliphatic polyamide resin and a polyolefin elastomer, the flexibility, durability, and the like become more excellent.

A case in which the aliphatic polyamide resin and the polyolefin elastomer are blended as described above and a fine alloy structure in which island phases of the polyolefin elastomer are dispersed in a sea phase of the aliphatic polyamide resin is adopted is preferred because further enhancement effects on the flexibility, the durability, and the like are obtained without the impairment of the refrigerant permeation resistance provided by the aliphatic polyamide resin.

Examples of the polyolefin elastomer include polyethylene, polypropylene, polymethylpentene, an ethylene-butene copolymer, an ethylene-propylene copolymer (EPR), an ethylene-propylene-diene terpolymer (EPDM), an isoprene rubber (IR), a styrene-ethylene-butylene-styrene copolymer (SEBS), a modified ethylene-butene copolymer, an ethylene-ethyl acrylate copolymer (EEA), a modified EEA, a modified EPR, a modified EPDM, an ionomer, an α-olefin copolymer, a modified IR, a modified SEBS, a halogenated isobutylene-p-methylstyrene copolymer, an ethylene-acrylic acid modified product, an ethylene-vinyl acetate copolymer, and an acid modified product of an ethylene-vinyl acetate copolymer, and mixtures containing those elastomers as main components. Those polyolefin elastomers may be used alone or in combination thereof.

In addition, in the blend polymer of the aliphatic polyamide resin and the polyolefin elastomer as described above, a content ratio between the aliphatic polyamide resin and the polyolefin elastomer preferably falls within the range of "aliphatic polyamide resin/polyolefin elastomer=50/50 to 90/10" in terms of weight ratio from the viewpoints of the flexibility, the durability, and the like, and more preferably falls within the range of "aliphatic polyamide resin/polyolefin elastomer=60/40 to 80/20" from similar viewpoints.

In addition, the melting point of the aromatic secondary amine compound (B) to be contained as a material for forming the innermost layer 1 is preferably 130° C. or more because hydrolytic deterioration-preventing performance becomes more excellent. The melting point is more preferably 200° C. or more. The upper limit of the melting point of the aromatic secondary amine compound (B) is generally 300° C.

When the melting point of the aromatic secondary amine compound (B) is excessively low, the aromatic secondary amine compound (B) is decomposed or volatilized by heat received at the time of the melt-mixing of the resin composition for forming the innermost layer 1, and hence its substantial content is reduced. In addition, when the melting point of the aromatic secondary amine compound (B) is excessively low, the aromatic secondary amine compound (B) has a large difference in viscosity from the polyamide resin at the time of extrusion processing, and hence is not uniformly dispersed. Accordingly, there is a risk in that the hydrolysis of the polyamide resin cannot be effectively suppressed. In addition, also when the melting point of the aromatic secondary amine compound (B) is excessively high, the aromatic secondary amine compound (B) is not melt-mixed, and hence causes a dispersion failure. Accordingly, there is a risk in that the hydrolysis of the polyamide resin cannot be effectively suppressed. From those viewpoints, the melting point of the aromatic secondary amine compound (B) falls within preferably the range of from 150° C. or more to 300° C. or less, more preferably the range of from 200° C. or more to 250° C. or less.

In addition, the aromatic secondary amine compound (B) to be contained as a material for forming the innermost layer 1 is preferably a compound having two or more aromatic rings per molecule because thermal deterioration resistance becomes more excellent.

Further, the aromatic secondary amine compound (B) preferably has a weight-average molecular weight (Mw) of 200 or more because the hydrolytic deterioration-preventing performance and the like become more excellent.

Specifically, compounds represented by the following chemical formulae (1) to (4) are each preferably used as the aromatic secondary amine compound (B). Those compounds may be used alone or in combination thereof.

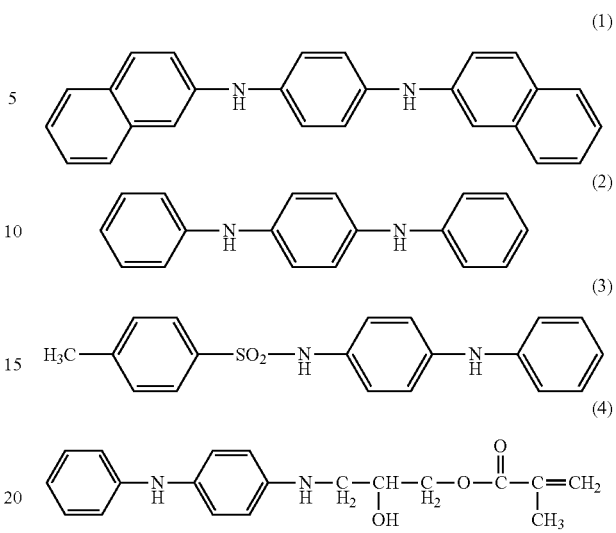

NOCRAC white, NOCRAC DP, NOCRAC TD, and NOCRAC G-1 manufactured by Ouchi Shinko Chemical Industrial Co., Ltd. are commercially available products that may be preferably used as the aromatic secondary amine compounds represented by the chemical formulae as described above, respectively.

In addition, in the resin composition serving as the material for forming the innermost layer 1, the content ratio of the specific aromatic secondary amine compound (B) with respect to 100 parts by weight of the polymer containing the polyamide resin (A) as the main component falls within preferably the range of from 0.5 parts by weight to 50 parts by weight, more preferably the range of from 1 part by weight to 20 parts by weight. That is, this is because, when the specific aromatic secondary amine compound (B) is contained within such range, a satisfactory hydrolysis-preventing effect can be obtained without the impairment of the flexibility of the hose or the molding processability.

The material for forming the innermost layer 1 may be appropriately blended with an additive, such as a filler, a plasticizer, or an antioxidant, as required.

As a material for forming the rubber layer 2 arranged on the outer periphery of the innermost layer 1, there are given rubbers, such as a butyl rubber (IIR), a halogenated butyl rubber, such as a chlorinated butyl rubber (Cl-IIR) or a brominated butyl rubber (Br-IIR), an acrylonitrile-butadiene rubber (NBR), a chloroprene rubber (CR), an ethylene-propylene-diene rubber (EPDM), an ethylene-propylene rubber (EPM), a fluorine rubber (FKM), an epichlorohydrin rubber (ECO), an acrylic rubber, a silicone rubber, a chlorinated polyethylene rubber (CPE), and a urethane rubber. Those rubbers may be used alone or in combination thereof. In addition to the rubbers, a crosslinking agent (vulcanizer), carbon black, or the like is appropriately blended.

In particular, the rubber layer 2 is preferably formed of a rubber composition containing a peroxide crosslinking agent because its interlayer adhesiveness with the innermost layer 1 becomes more excellent. An adhesive may be appropriately applied between the innermost layer 1 and the rubber layer 2.

The rubber layer 2 has a single-layer structure in FIG. 1, but may have a laminated structure of two or more layers. In addition, when the rubber layer 2 includes two or more layers, rubber compositions for forming the respective layers may be identical to or different from each other. In addition, for example, a reinforcing layer formed by braiding reinforcing yarns made of, for example, polyethylene terephthalate (PET), polyethylene naphthalate (PEN), aramid, polyamide (nylon), polyvinyl alcohol (vinylon), rayon, or a metal wire by spiral braiding, knit braiding, blade braiding, or the like may be arranged between the two or more rubber layers.

Such hose for transporting a refrigerant of the present disclosure as illustrated in FIG. 1 described above may be produced, for example, as described below. That is, first, the materials for forming the innermost layer 1 described above are melt-mixed to prepare the resin composition for forming the innermost layer 1. In addition, a material for the rubber layer 2 is also prepared. Next, the resin composition for forming the innermost layer 1 and the material for the rubber layer 2 are subjected to co-extrusion molding into a hose shape. At this time, a mandrel may be used. In addition, the resin composition for forming the innermost layer 1 may be subjected to extrusion molding into a hose shape in advance, followed by the extrusion molding of the rubber layer 2. Then, the resultant is vulcanized under predetermined conditions (preferably 170° C.×30 minutes to 60 minutes), and then the mandrel is removed. Thus, a hose for transporting a refrigerant of a target layer structure can be produced.

In the hose for transporting a refrigerant of the present disclosure, a hose inner diameter preferably falls within the range of from 5 mm to 40 mm. In addition, the thickness of the innermost layer 1 falls within preferably the range of from 0.05 mm to 0.50 mm, particularly preferably the range of from 0.10 mm to 0.20 mm. That is, this is because of the following reasons: when the thickness of the innermost layer 1 is excessively small, it becomes difficult to obtain desired refrigerant permeation resistance, and when the thickness of the innermost layer 1 is excessively large, there is a risk of a degradation in vibration-absorbing property. Meanwhile, the thickness of the rubber layer 2 is generally set to the range of from 1 mm to 39 mm from the viewpoint of pressure resistance.

The hose for transporting a refrigerant of the present disclosure is preferably used as a hose for transporting not only a refrigerant that is liable to exhibit acidity, such as an R-1234yf refrigerant, but also a refrigerant, such as carbon dioxide, a chlorofluorocarbon, an alternative chlorofluorocarbon, propane, or water, to be used in an air conditioner radiator or the like. The hose for transporting a refrigerant is also preferably used not only for an automobile but also for any other transportation machine (e.g., an industrial transportation vehicle, such as an airplane, a fork lift, a digger, or a crane, or a railway vehicle), a vending machine, or the like.

EXAMPLES

Next, Examples of the present disclosure are described together with Comparative Examples. However, the present disclosure is not limited to these Examples.

First, prior to Examples and Comparative Examples, the following materials were prepared as innermost layer materials.

Polyamide 1

Mixed resin of 75 wt. % of Polyamide 6 (UBE1030B, manufactured by Ube Industries, Ltd.) and 25 wt. % of polyolefin (TAFMER MH7020, manufactured by Mitsui Chemicals, Inc.)

Polyamide 2

Polyamide 11 (Rilsan BESN O TL, manufactured by Arkema K.K.)

Amine Compound 1

Aromatic secondary amine compound represented by the chemical formula (1) (NOCRAC White, manufactured by Ouchi Shinko Chemical Industrial Co., Ltd.) (melting point: 225° C.)

Amine Compound 2

Aromatic secondary amine compound represented by the chemical formula (2) (NOCRAC DP, manufactured by Ouchi Shinko Chemical Industrial Co., Ltd.) (melting point: 130° C.)

Amine Compound 3

Aromatic secondary amine compound represented by the chemical formula (3) (NOCRAC TD, manufactured by Ouchi Shinko Chemical Industrial Co., Ltd.) (melting point: 135° C.)

Amine Compound 4

Aromatic secondary amine compound represented by the chemical formula (4) (NOCRAC G-1, manufactured by Ouchi Shinko Chemical Industrial Co., Ltd.) (melting point: 115° C.)

Amine Compound 5

Aromatic secondary amine compound represented by the following chemical formula (5) (NOCRAC 6C, manufactured by Ouchi Shinko Chemical Industrial Co., Ltd.) (melting point: 44° C.)

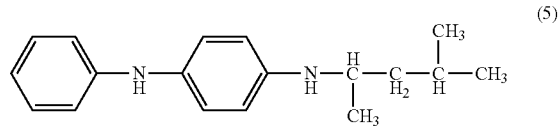 [SMILES: CC(C)CC(C)Nc1ccc(Nc2ccccc2)cc1]

Carbodiimide

CARBODILITE LA-1, manufactured by Nisshinbo Chemical Inc.

Examples 1 to 6 and Comparative Examples 1 to 5

Respective materials (innermost layer materials) shown in Table 1 and Table 2 to be shown later were melt-mixed at 260° C. in a ratio shown in Table 1 and Table 2 to be shown later to prepare a polyamide resin composition for forming an innermost layer. Next, the polyamide resin composition for forming an innermost layer was subjected to melt-extrusion molding onto a resin mandrel (outer diameter: 8 mm). EPDM containing a peroxide crosslinking agent was subjected to extrusion molding onto the outer peripheral surface of the thus formed innermost layer (thickness: 0.2 mm), followed by thermal crosslinking to form a rubber layer (thickness: 0.5 mm). Then, after the thermal crosslinking, the mandrel was removed from the resultant laminated hose body, and an elongated molded article was cut to produce a target hose for transporting a refrigerant (see FIG. 1).

The hoses for transporting a refrigerant of the Examples and Comparative Examples thus obtained were evaluated for respective characteristics in accordance with the following criteria. The results are shown together in Table 1 and Table 2 to be shown later.

Refrigerant-Refrigerating Machine Oil Resistance (Condition 1)

A test piece (DIN 53504-S3A dumbbell) taken from the innermost layer of each of the hoses of the Examples and Comparative Examples was placed in a mixed liquid (concentration: 10,000 ppm) obtained by adding 450 µl of water to 45 g of an oil (Daphne Hermetic Oil, manufactured by Idemitsu Kosan Co., Ltd.). Subsequently, vacuum drawing was performed in the mixed liquid having the test piece placed therein at a low temperature (−35° C.) for 30 seconds, and 60 g of an alternative chlorofluorocarbon gas (R-1234yf) was added thereto. Then, the mixed liquid having the test piece placed therein was left to stand in an oven at 150° C. for 72 hours. After that, the test piece taken out of the mixed liquid was subjected to a tensile test at an ambient temperature of 23° C. and a tension speed of 200 mm/min, and its tensile elongation (%) was measured. Then, the refrigerant-refrigerating machine oil resistance was evaluated as follows: a case in which the tensile elongation was 200% or more was indicated by Symbol "oo", a case in which the tensile elongation was 100% or more and less than 200% was indicated by Symbol "o", and a case in which the tensile elongation was less than 100% was indicated by Symbol "x".

Refrigerant-Refrigerating Machine Oil Resistance (Condition 2)

A test piece (DIN 53504-S3A dumbbell) taken from the innermost layer of each of the hoses of the Examples and Comparative Examples was placed in a mixed liquid (concentration: 10,000 ppm) obtained by adding 450 µl of water to 45 g of an oil (Daphne Hermetic Oil, manufactured by Idemitsu Kosan Co., Ltd.). Subsequently, vacuum drawing was performed in the mixed liquid having the test piece placed therein at a low temperature (−35° C.) for 30 seconds, and 60 g of an alternative chlorofluorocarbon gas (R-1234yf) was added thereto. Then, the mixed liquid having the test piece placed therein was left to stand in an oven at 150° C. for 120 hours. After that, the test piece taken out of the mixed liquid was subjected to a tensile test at an ambient temperature of 23° C. and a tension speed of 200 mm/min, and its tensile elongation (%) was measured. Then, the refrigerant-refrigerating machine oil resistance was evaluated as follows: a case in which the tensile elongation was 100% or more and less than 200% was indicated by Symbol "oo", a case in which the tensile elongation was 75% or more and less than 100% was indicated by Symbol "o", a case in which the tensile elongation was 50% or more and less than 75% was indicated by Symbol "Δ", and a case in which the tensile elongation was less than 50% was indicated by Symbol "x".

Flexibility (Tensile Elastic Modulus)

The innermost layer materials for each of the hoses of the Examples and Comparative Examples were subjected to extrusion molding with a T-die to produce a resin film having a thickness of 0.15 mm. Subsequently, the resin film was subjected to punch molding for tensile evaluation to produce a test piece. The test piece was measured for its tensile elastic modulus (MPa) inconformity with ASTM D638. Then, the flexibility was evaluated as follows: a case in which the tensile elastic modulus was less than 800 MPa was indicated by Symbol "o", and a case in which the tensile elastic modulus was 800 MPa or more was indicated by Symbol "x".

TABLE 1

| | | Example | | | | | Comparative Example (part(s) by weight) | | | |
|---|---|---|---|---|---|---|---|---|---|---|
| | | 1 | 2 | 3 | 4 | 5 | 1 | 2 | 3 | 4 |
| Polyamide 1 | | 100 | 100 | 100 | 100 | 100 | 100 | 100 | 100 | 100 |
| Amine compound 1 | | 4 | — | — | — | 0.3 | — | — | — | — |
| Amine compound 2 | | — | 4 | — | — | — | — | — | — | — |
| Amine compound 3 | | — | — | 4 | — | — | — | — | — | — |
| Amine compound 4 | | — | — | — | 4 | — | — | — | — | — |
| Amine compound 5 | | — | — | — | — | — | — | — | — | 4 |
| Carbodiimide | | — | — | — | — | — | — | 4 | 0.3 | — |
| Refrigerant-refrigerating machine oil resistance | Condition 1 | oo | o | o | o | o | x | o | x | o |
| | Condition 2 | oo | o | o | Δ | o | x | x | x | x |
| Flexibility | | o | o | o | o | o | o | x | o | o |

TABLE 2

| | | Example 6 | Comparative Example 5 (part(s) by weight) |
|---|---|---|---|
| Polyamide 2 | | 100 | 100 |
| Amine compound 1 | | 4 | — |
| Carbodiimide | | — | 4 |
| Refrigerant-refrigerating machine oil resistance | Condition 1 | oo | o |
| | Condition 2 | oo | x |
| Flexibility | | o | x |

As can be seen from the results of the tables, each of the hoses of the Examples is excellent in refrigerant-refrigerating machine oil resistance and flexibility. The innermost layer of each of the hoses of Examples 1 to 5 was observed with a scanning electron microscope (SEM), and as a result, was found to be formed of an alloy containing polyamide 6 as a sea phase (matrix) and polyolefin as island phases (domains).

In contrast, each of the hoses of the Comparative Examples was poor (indicated by Symbol "x") in the evaluation of at least one of the refrigerant-refrigerating machine oil resistance and the flexibility.

Although specific embodiments of the present disclosure have been described in the Examples above, the Examples are for illustrative purposes only and are not to be construed as limitative. It is intended that various modifications apparent to a person skilled in the art fall within the scope of the present disclosure.

The hose for transporting a refrigerant of the present disclosure is preferably used as a hose for transporting not only a refrigerant that is liable to exhibit acidity, such as the R-1234yf refrigerant, but also a refrigerant, such as carbon dioxide, a chlorofluorocarbon, an alternative chlorofluorocarbon, propane, or water, to be used in an air conditioner radiator or the like. The hose for transporting a refrigerant is also preferably used not only for an automobile but also for any other transportation machine (e.g., an industrial transportation vehicle, such as an airplane, a fork lift, a digger, or a crane, or a railway vehicle), a vending machine, or the like.

REFERENCE SIGNS LIST 1 innermost layer
2 rubber layer

The invention claimed is:
1. A hose for transporting a refrigerant, comprising:
an innermost layer having a tubular shape; and
a rubber layer arranged on an outer periphery of the innermost layer,
wherein the innermost layer comprises, as a polymer, a blend polymer formed of the following component (A-1) and component (A-2), the blend polymer containing the following component (A-1) as a main component,
wherein the innermost layer comprises, with respect to 100 parts by weight of the blend polymer, the following component (B) in a range of from 1 part by weight to 50 parts by weight, and
wherein, in the innermost layer, island phases of the following component (A-2) are dispersed in a sea phase of the following component (A-1):
(A-1) at least one aliphatic polyamide resin selected from the group consisting of polyamide 46, polyamide 6, polyamide 66, polyamide 610, polyamide 612, and polyamide 1010;
(A-2) a polyolefin elastomer;
(B) an aromatic secondary amine compound having two secondary amino groups per molecule and having a melting point of 200° C. or more.
2. The hose for transporting a refrigerant according to claim 1, wherein the aromatic secondary amine compound (B) comprises a compound having two or more aromatic rings per molecule.

* * * * *